Figure 1:
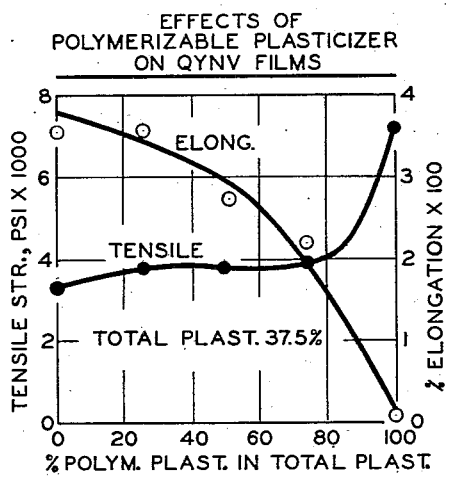

Sept 17, 1957   D. E. HARDMAN   2,806,828
PLASTICIZED VINYL RESIN COMPOSITION
Filed Aug. 4, 1954

INVENTOR
DONALD E. HARDMAN
BY
Charles E. Howson
ATTORNEY

United States Patent Office 2,806,828
Patented Sept. 17, 1957

2,806,828
PLASTICIZED VINYL RESIN COMPOSITION

Donald E. Hardman, South Charleston, W. Va., assignor to Union Carbide Corporation, a corporation of New York Application August 4, 1954, Serial No. 447,757

17 Claims. (Cl. 260—30.4)

This invention relates to novel vinyl resin compositions containing certain novel compounds of phosphorus as processing aids, the latter of which can be cured in suitable manner and converted into a non-migrating, non-extractable component of the resin article made therefrom. The invention has especial utility for the production of vinyl resin plastisols and organosols wherein the novel phosphorus-containing compounds function effectively as polymerizable plasticizers for the vinyl resin. The term "plastisol" as used herein designates fluid suspensions of finely divided resinous polymers in liquid plasticizers. Organosols differ therefrom in having part of the plasticizer replaced with a balanced volatile thinner.

Among vinyl resins useful in making the resin dispersions of this invention are the polyvinyl chlorides; the copolymers of vinyl chloride and another polymerizable olefinically unsaturated compound such as vinyl acetate, vinyl propionate, methyl acrylate, butyl acrylate, methyl methacrylate, butyl methacrylate, acrylonitrile, vinylidene chloride, and dibutyl maleate; and polyvinyl butyral resins.

Preferably dispersion-type resins made by emulsion-polymerization processes are employed, particularly in the production of plastisols and organosols, but are not essential since resins made by solution-type, bulk-type and suspension-type polymerization processes can be used in the manner in which these resins are normally processed.

It has long been known that the amount of a liquid plasticizer of the usual ester type required to make a useful plastisol with vinyl resins always yields a product which, when cured, is too soft and elastic for many uses. To make the plastisol technique more versatile and to improve the products many attempts have been made to find a liquid polymerizable plasticizer for vinyl resins which would render the resultant dispersion fluid at room temperature and which would be capable of curing rapidly in the presence of the usual polymerization catalysts at commercially practicable elevated temperatures for dispersion coatings. Prior to this invention none of the proposed polymerizable plasticizers have been entirely satisfactory, due in part to the inadequate reactivity of such polymerizable plasticizer during the curing or baking cycle under conditions whereby the continued compatibility of the resin and plasticizer is assured.

According to the present invention novel-dispersions of vinyl resins of the type hereindisclosed, which are highly useful as plastisols, organosols, and plastic compositions, are made in well known manner by intimately mixing by grinding or stirring the finely-divided resin, preferably of the dispersion-type made by emulsion-polymerization processes, with a novel polymerizable plasticizer of the type hereinafter described—preferably in conjuction with a small amount of a peroxy polymerization catalyst—with or without one or more of the known vinyl resin plasticizers of the ester type—until a smooth dispersion is obtained. The resultant dispersions, after reshaping by casting, molding, extruding, calendering, coating or by other known methods, to form films or other shaped articles, are converted to the cured or gel state by heating at around 300° F. to 350° F. for 5 to 25 minutes, and then cooling to room temperature or other suitable temperature.

In order to facilitate the curing of the polymerizable plasticizer within the resin dispersion in a practicable time it is preferred to incorporate in the dispersion from 0.5% to about 5% of a polymerization catalyst, based upon the weight of the polymerizable plasticizer. While any of the usual peroxy polymerization catalysts such as benzoyl peroxide, acetyl peroxide, and the chlorine-substituted acyl peroxides are effective, it is preferred to use t-butyl perbenzoate or benzoyl peroxide.

A polymerization inhibitor such as hydroquinone can be present in the resin dispersion, if desired, to inhibit premature polymerization of the polymerizable plasticizer. The usual heat-stabilizers and light-stabilizers for the resin also may be present in the dispersion, as indicated in the examples.

The polymerizable plasticizers useful with this invention are monomeric olefinically unsaturated, phosphorus-containing compounds having structures represented by the formula

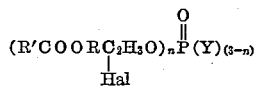

wherein R designates a divalent methylene or ethylene radical; R' designates an unsaturated hydrocarbon radical containing at least one olefinic double bond and preferably having from 2 to 20 carbon atoms; Hal designates chlorine or bromine; and each Y designates a radical of the class consisting of the alkoxy, aryloxy, chloroalkoxy, bromoalkoxy, chloroaryloxy and bromoaryloxy radicals, and two Y's together designates the group

wherein each $R^2$, $R^3$, $R^4$, $R^5$ and $R^6$, respectively, designates a member of the class consisting of hydrogen and the alkyl radicals; and $n$ is an integer from 1 to 3.

Among such compounds of the invention useful as polymerizable plasticizers in these novel compositions may be mentioned the diethyl, dibutyl, dioctyl, didecyl, di-2-chloroethyl, diphenyl, dibenzyl and di-(p-chlorophenyl) acrylyloxychloropropyl phosphates and the corresponding methacrylyloxychloropropyl phosphates and crotonyloxy-chloropropyl phosphates. The preferred compounds, however, are the heterocyclic 2-methacrylyloxychloro-propoxy-2-oxo-1,3,2-dioxaphosphorinanes, both unsubstituted and substituted on one or more carbon atoms of the heterocyclic ring with an alkyl group or groups; and similar compounds in which the methacrylyloxychloro-propoxy group is replaced by the acrylyloxychloropro-poxy or the crotonyloxychloropropoxy group. Among such compounds may be mentioned the 2-methacrylyloxy-chloropropoxy-substituted, the 2-crotonyloxychloropro-poxy-substituted and the 2-acrylyloxychloropropoxy-substituted:

2-oxo-1,3,2-dioxaphosphorinane;
4-methyl-2-oxo-1,3,2-dioxaphosphorinane;
4,6-dimethyl-2-oxo-1,3,2,-dioxaphosphorinane;
5-ethyl-2-oxo-4-propyl-1,3,2-dioxaphosphorinane;
5-butyl-5-ethyl-2-oxo-1,3,2-dioxaphosphorinane; and
2-oxo-4,4,6-trimethyl-1,3,2-dioxaphosphorinane.

These polymerizable compounds can be made by reacting an epoxy-containing ester of an unsaturated mono-carboxylic acid of the type:

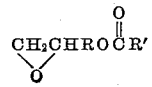

with a phosphorus compound of the formula

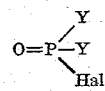

wherein R, R', Y and Hal, respectively, have the hereinbeforedescribed meanings, in the presence of a catalyst of the class consisting of the halides of titanium, zirconium, aluminum and tin, at temperatures within the range from 2° C. to 125° C. Such a process is described in the pending application, Serial No. 372,814 of W. M. Lanham, filed August 6, 1953.

To secure compositions of good physical properties it is desirable that the resins be of high average molecular weights. The useful copolymers of vinyl chloride with other polymerizable monomers usually contain major amounts of the vinyl chloride. The preferred resins are polyvinyl chlorides, and copolymers of vinyl chloride with vinyl acetate containing around 85–99% of the vinyl chloride. These, and the other vinyl resins mentioned herein can be employed in resin to plasticizer weight ratios in the range from 4:1 to 1:1 or less.

Surprisingly it has been found that the polymerizable plasticizers of this invention not only are compatible with the various vinyl resins of the types hereindescribed but also are compatible with the usual non-polymerizable ester plasticizers commonly used with these resins, such as the aryl and alkyl phosphates, and the alkyl phthalates, adipates, sebacates, azelate, and epoxidized vegetable oils. Among these can be mentioned tri-(2-ethylhexyl) phosphate, tricresyl phosphate, di-(2-ethylhexyl) phthalate and the corresponding adipate, dioctyl sebacate, and epoxidized soya bean oils. Excellent clear plastisols have been made by intimately mixing a vinyl resin such as a polyvinyl chloride with up to 37.5% or more of a mixture of plasticizers, based upon the weight of the plastisol, of which one thereof is a polymerizable phosphorus-containing compound of this invention and is present in an amount up to 75% by weight of the total plasticizer, and of which the other is a non-polymerizable higher alkyl ester of a dicarboxylic acid wherein each alkyl group contains at least two carbon atoms, such as dibutyl phthalate, dioctyl phthalate and di-2-ethylhexyl sebacate, and alkyl phosphates such as trioctyl phosphate.

The compatibility with vinyl resins of the polymerizable plasticizers of the invention is outstandingly good, particularly in the case of the poylvinyl chloride resins; and this compatibility is attained without the need for having present in the plasticized composition any component causing objectionable losses of volatiles during the fabrication or use of articles made therefrom. The outstanding superior compatibility of those polymerizable plasticizers of the invention that have a dioxaphosphorinanyl ring structure over the usual phosphate esters is attributed to the surprising and outstanding solvating power that the phosphorus-containing heterocyclic ring structure of these compounds have for these resins, far exceeding in this respect the ester plasticizers previously known.

Figure 2:
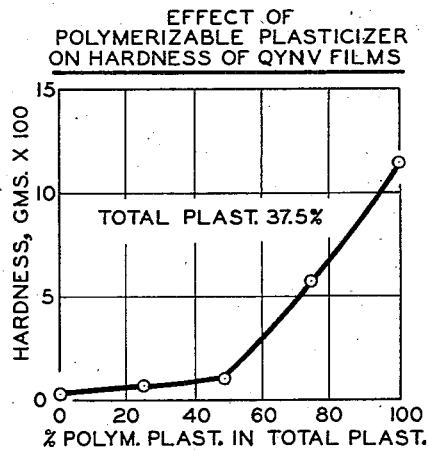
Figure 3:
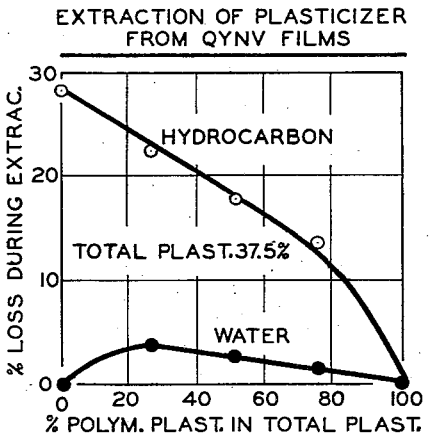

In the accompanying drawing, which illustrates the effectiveness of a typical polymerizable plasticizer of the invention in improving certain physical properties of films made from polyvinyl chloride plastisols, both when used as the sole plasticizer and when used with various amounts of a commonly used organic ester plasticizer, Fig. 1 is a chart showing the improvement in tensile strength and elongation of cured films made from the plastisols; Fig. 2 is a chart showing the improvement in film hardness effected by the use of these polymerizable plasticizers; and Fig. 3 illustrates the improvement in the resistance of such films to extraction of the plasticizer by water and by aliphatic hydrocarbon mixtures. The films examined were made by casting upon aluminum foil a series of plastisols containing a commercially available polyvinyl chloride and a typical polymerizable plasticizer, 5-ethyl-2-methacrylyloxychloropropoxy-2-oxo-4-propyl - 1,3,2-dioxaphosphorinane, in the weight ratio of 100:60 and a series of similar plastisols wherein varying amounts of the polymerizable plasticizer were replaced by an equal weight of di-(2-ethylhexyl) phthalate. The plastisols also contained up to 3% of t-butyl perbenzoate catalyst. The cast films, 4–5 mils in dry thickness, were baked 5 minutes at 350° F. before testing. The tensile strength and elongation measurements were made at 25° C. on specimens 0.5" x 6", using a Scott IP–4 Serigraph. The hardness was measured using a Pfund Hardness Tester at 25° C. the data of Fig. 2 being plotted as the number of grams required to make an 0.6 mm. diameter indentation in the film with a quartz hemisphere. The extraction tests were made on 3" discs of the plastisol film, the tests being run for ten days, using distilled water and "Apcothinner," a commercially available mixture of aliphatic hydrocarbons.

It will be noted from Fig. 1 that the tensile strength of the films gradually increased as the percent of polymerizable plasticizer increased up to about 75% of the total plasticizer, and above that the film strength rapidly increased. Fig. 2 shows that the hardness of the films increased slowly up to 50% of the polymerizable plasticizer, after which it increased rapidly. Fig. 3 shows that the water extraction values increased with increase in percent of polymerizable plasticizer until about 20% of the phthalate ester plasticizer had been replaced, and then gradually declined to zero when only the polymerizable plasticizer was present. In the hydrocarbon extraction tests, the films containing only the phthalate ester lost almost all of this plasticizer, whereas those containing only the polymerizable plasticizer lost less than 2% thereof during ten days at 25° C.±2° C.

The following examples serve to illustrate the invention.

Example 1

A plastisol containing 100 parts of a resinous polyvinyl chloride, 60 parts of 5-ethyl-2-methacrylyloxychloropropoxy-2-oxo-4-propyl-1,3,2-dioxaphosphorinane by weight, and containing 1% of t-butyl perbenzoate, based upon the weight of the polymerizable plasticizer, was made by stirring the ingredients together. Films were made from this plastisol by casting on aluminum foil, films of 6–8 mils wet thickness with a Martinson coater. These films after baking 5 minutes at 350° F. on aluminum foil, were far superior in hardness, freedom from tackiness, resistance to extraction by water and by aliphatic hydrocarbons, and in toughness, to similar films wherein the polymerizable plasticizer was replaced by a widely used ester plasticizer, di-(2-ethylhexyl) phthalate. Figures 1 to 3 of the accompanying drawing illustrate the above qualities, as well as the properties possessed by films made from plastisols wherein various amounts of the polymerizable plasticizer have been replaced with di-2-ethylhexy phthalate.

Example 2

A plastisol containing 100 parts of resinous polyvinyl chloride, 30 parts of 5-butyl-5-ethyl-2-methacrylyloxychloropropoxy - 2 - oxo-1,3,2-dioxaphosphorinane, and 30 parts of di(2-ethylhexyl) phthalate as non-polymerizable plasticizer, all parts by weight, was prepared by stirring the plasticizers and resin together in the presence of 1% of t-butyl perbenzoate, based upon the weight of the polymerizable plasticizer. Films were prepared from this plastisol by casting on aluminum foil. The cast films were cured 5 minutes at 350° F. The cured films were extremely clear and flexible, with very desirable dry surfaces free from tackiness.

By substituting for the di(2-ethylhexyl) phthalate an additional 30 parts of the polymerizable plasticizer, plastisols were obtained which yielded cured films which were substantially harder and less flexible than those first named.

Example 3

An acetone solution containing 10% of a resinous copolymer of vinyl chloride and acrylonitrile containing 60% of vinyl chloride was mixed with 5-ethyl-2-methacrylyloxychloropropoxy-2-oxo-4-propyl-1,3,2-dioxaphosphorinane in amounts to provide two casting solutions respectively containing the resin and plasticizer in the weight ratios of 2 to 1 and of 1 to 1; and 1% of t-butyl perbenzoate, based upon the weight of the plasticizer, were intimately mixed therewith. These respective compositions were poured into open glass molds and the solvent evaporated to form 40-60 mil plaques. The components of the latter, after curing for one hour at 300° F., were completely compatible, and the plaque was free from tackiness with very little flexibility.

Example 4

A plastisol containing 100 parts of a resinous polyvinyl chloride and 60 parts of 5-butyl-2-crotonyloxychloropropoxy - 5 - ethyl-2-oxo-1,3,2-dioxaphosphorinane, all parts by weight, plus 3% of t-butyl perbenzoate, based upon the plasticizer weight, was prepared by stirring the plasticizer and resin together. Films were cast from this composition on aluminum foil. After curing for 15 minutes at 350° F., excellent films were secured which were far superior in hardness, freedom from tackiness, and toughness to similar plastisol films wherein the sole plasticizer was di-(2-ethylhexyl) phthalate. The films showed excellent compatibility between the resin and plasticizer.

Example 5

Following the procedure of Example 4, a plastisol was prepared using 100 parts of a resinous polyvinyl chloride, 60 parts of 2-acrylyloxychloropropoxy-5-butyl-5-ethyl-2-oxo-1,3,2-dioxaphosphorinane, all parts by weight, together with 3% of t-butyl perbenzoate catalyst, based upon the weight of the plasticizer. Films cast from this plastisol in the general manner described in Example 4, cured in 15 minutes at 350° F. to produce excellent cured films having substantial flexibility.

Example 6

A calendering composition was prepared by milling 100 parts of a copolymer of vinyl chloride and vinyl acetate containing around 96% of vinyl chloride in the polymer, 27.1 parts of 5-ethyl-2-methacrylyloxychloropropoxy-2-oxo-4-propyl-1,3,2-dioxaphosphorinane, 27.1 parts of di-(2-ethylhexyl) phthalate, 0.77 part of dibutyl tin dimaleate stabilizer, and 0.82 part of t-butyl perbenzoate, all parts by weights. This composition was milled for 5 minutes on a 2 roll mill; and a portion of the stock was pressed into a 40-60 mil plaque using a positive mold heated at 158° C. (316° F.). The resultant plaque possessed some flexibility, was homogeneous, and free from tackiness. This example demonstrates that these polymerizable plasticizers are useful as processing aids in calendering and extrusion operations where rigid or semi-rigid stock is sought.

Example 7

The following example illustrates the use of these polymerizable plasticizers in the production of vinyl resin plastisol floor coverings, when used in conjunction with a commercially available plasticizer, di-(2-ethylhexyl) phthalate, in a 3 to 1 weight ratio, and compares the product with one made from a similar plastisol containing only the non-polymerizable plasticizer. Two fluid plastisol pastes or compositions A and B, respectively, were prepared by intimately mixing the components mentioned in Table 1, all parts being given by weight.

TABLE I

|  | A | B |
| --- | --- | --- |
| Polyvinyl chloride | 100 | 100 |
| Royal York Whiting | 200 | 200 |
| Di-(2-ethylhexyl) phthalate | 100 | 25 |
| Polymerizable plasticizer |  | 75 |

Composition B also had mixed therewith 1% of t-butyl perbenzoate catalyst, based upon the weight of the polymerizable plasticizer. Both compositions were fluid pastes, with composition A being the least viscous. Plaques 3/16 inch thick were molded from each composition under pressure at 176° C.

An indentation test modelled after the method described in Report BMS14 of the United States Department of Commerce Building Materials and Structures was employed to test these samples, together with samples of two commercially available vinyl floor tiles C and D, using varying loads applied to a 1/4 inch diameter rod set on end against the samples with provision for measuring indentation. The load was applied for 30 minutes at 25° C., and recovery after 5 minutes and after 120 minutes was noted. The resultant data is presented in the following table:

TABLE II

| Sample | Durometer hardness A scale | Sample thickness, mm. | Indentation, mm. | | |
| --- | --- | --- | --- | --- | --- |
|  |  |  | 158#/in.² 30 min. | Load removed | |
|  |  |  |  | 5 min. | 120 min. |
| A | 74 | 4.8 | 4.2 | 0.73 | 0.50 |
| B | 92 | 4.8 | 1.4 | 0.81 | 0.26 |
| C | 92 | 6.3 | 0.60 | 0.43 | 0.34 |
| D | 82 | 6.3 | 4.45 | 1.23 | 0.88 |

Example 8

A plastisol was made by intimately mixing 100 parts of a resinous polyvinyl chloride dispersed in 60 parts of di-(n-butyl) methacrylyloxychloropropyl phosphate, all parts by weight, together with 1% of t-butyl perbenzoate catalyst, based upon the weight of the said phosphate. Films prepared from the resultant homogeneous plastisol dispersion, after curing for 5 minutes at 340° F. on aluminum foil, were flexible and free from tackiness.

Example 9

A plastisol containing 100 parts of emulsion polymerized polyvinyl chloride and 60 parts of diethyl methacrylyloxychloropropyl phosphate, all parts by weight, together with 3% of t-butyl perbenzoate, based upon the weight of the said phosphate, was prepared by stirring the ingredients together. A cast film prepared from the plastisol was baked for 5 minutes at 350° F. on aluminum foil. The baked film was tough, flexible and free from tackiness. However, volatility of the plasticizer, as measured by the loss in weight of the film on heating to 350° F., was undesirably high for some applications.

Example 10

Following the procedure of Example 9, a plastisol was prepared with 100 parts of a resinous polyvinyl chloride, 60 parts of diphenyl methacrylyloxychloropropyl phosphate, all parts by weight, together with 3% of t-butyl perbenzoate catalyst, based upon the weight of the plasticizer. Films cast from this plastisol in the general manner described in Example 9, cured in 5 minutes at 350° F. to produce excellent films.

Example 11

A homogeneous pasty dispersion of equal parts by weight of a finely divided polyvinyl butyral resin in 5-ethyl - 2 - methacrylyloxychloropropoxy - 2-oxo-4-propyl-1,3,2-dioxaphosphorinane, together with 1% of t-butyl perbenzoate catalyst, based upon the weight of the phosphorus-containing compound, was prepared. A small quantity of this paste was placed upon two pieces of black iron sheet stock used in making metal cans, after which the pasted surfaces were pressed together under 50 lbs. per square inch pressure while heated at 375° F. The two pieces of metal were then pulled apart at the bond with an Instron tensile tester. A pull of 12 lbs. per square inch of glue line was required to separate the test pieces.

The invention is susceptible of modification within the scope of the appended claims.

I claim:

1. A plasticized vinyl resin composition, which comprises a vinyl resin selected from the class consisting of the polyvinyl chlorides, copolymers of vinyl chloride with a vinyl ester of a lower alkanoic acid, copolymers of vinyl chloride with an acrylic compound, and polyvinyl butyrals, and, as a polymerizable plasticizer therefor, an olefinically unsaturated phosphorus-containing compound having the structure

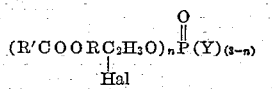

wherein R designates a divalent radical of the class consisting of the methylene and ethylene radicals; R' designates an unsaturated hydrocarbon radical containing an olefinic double bond and having two to twenty carbon atoms; Hal designates a radical of the group consisting of chlorine and bromine; and each Y designates a radical of the class consisting of the alkoxy, aryloxy, chloroalkoxy, bromoalkoxy, chloroaryloxy and bromoaryloxy radicals and two Y's together designate the group —OCR$^2$R$^3$CR$^4$R$^5$CHR$^6$O— wherein each R$^2$, R$^3$, R$^4$, R$^5$ and R$^6$, respectively, designates a member of the class consisting of hydrogen and the alkyl radicals; and $n$ is an integer from 1 to 3; the said composition also containing a small amount of a peroxy polymerization catalyst.

2. A plasticized vinyl resin composition, which comprises a finely-divided emulsion-polymerized vinyl resin selected from the class consisting of the polyvinyl chlorides, copolymers of vinyl chloride with a vinyl ester of a lower alkanoic acid, copolymers of vinyl chloride with an acrylic compound, and polyvinyl butyrals, and, as a polymerizable plasticizer therefor, a 2-methacrylyloxychloropropoxy-2-oxo-1,3,2-dioxaphosphorinane; and a small amount of a peroxy polymerization catalyst.

3. A plasticized vinyl resin composition, which comprises a finely-divided emulsion-polymerized vinyl resin selected from the class consisting of the polyvinyl chlorides, copolymers of vinyl chloride with a vinyl ester of a lower alkanoic acid, copolymers of vinyl chloride with an acrylic compound, and polyvinyl butyrals, and, as a polymerizable plasticizer therefor, a 2-methacrylyloxychloropropoxy-2-oxo-1,3,2-dioxaphosphorinane substituted on at least one of the carbon atoms of the heterocyclic ring with at least one alkyl group; and a small amount of the peroxy polymerization catalyst.

4. A plasticized vinyl resin composition, which comprises a finely-divided emulsion-polymerized vinyl resin selected from the class consisting of the polyvinyl chlorides, copolymers of vinyl chloride with a vinyl ester of a lower alkanoic acid, copolymers of vinyl chloride with an acrylic compound, and polyvinyl butyrals, and, as a polymerizable plasticizer therefor, a 2-methacrylyloxychloropropoxy-2-oxo-1,3,2,-dioxaphosphorinane; and a small amount of a peroxy polymerization catalyst, together with a plasticizer selected from the class consisting of the alkyl esters of saturated aliphatic dicarboxylic acids, the dialkyl phthalates, and the trialkyl phosphates.

5. A plasticized vinyl resin composition, which comprises a finely-divided emulsion-polymerized vinyl resin selected from the class consisting of the polyvinyl chlorides, copolymers of vinyl chloride with a vinyl ester of a lower alkanoic acid, copolymers of vinyl chloride with an acrylic compound, and polyvinyl butyrals, and, as a polymerizable plasticizer therefor, a 2-methacrylyloxychloropropoxy-2-oxo-1,3,2-dioxaphosphorinane substituted on at least one of the carbon atoms of the hetrocyclic ring with at least one alkyl group; and a small amount of the peroxy polymerization catalyst, together with a plasticizer selected from the class consisting of the alkyl esters of saturated aliphatic dicarboxylic acids, the dialkyl phthalates, and the trialkyl phosphates.

6. A plasticized vinyl resin composition, which comprises a finely-divided emulsion-polymerized vinyl resin selected from the class consisting of the polyvinyl chlorides, copolymers of vinyl chloride with a vinyl ester of a lower alkanoic acid, copolymers of vinyl chloride with an acrylic compound, and polyvinyl butyrals, and, as a polymerizable plasticizer therefor, a 2-acrylyloxychloropropoxy-2-oxo-1,3,2-dioxaphosphorinane, together with a small amount of a peroxy polymerization catalyst.

7. A plasticized vinyl resin composition, which comprises a finely-divided emulsion-polymerized vinyl resin selected from the class consisting of the polyvinyl chlorides, copolymers of vinyl chloride with a vinyl ester of a lower alkanoic acid, copolymers of vinyl chloride with an acrylic compound, and polyvinyl butyrals, and, as a polymerizable plasticizer therefor, a 2-acrylyloxychloropropoxy-2-oxo-1,3,2-dioxaphosphorinane substituted on at least one of the carbon atoms of the heterocyclic ring with at least one alkyl group; said composition also containing a small amount of a peroxy polymerization catalyst.

8. A plasticized vinyl resin composition, which comprises finely-divided emulsion-polymerized vinyl resin selected from the class consisting of the polyvinyl chlorides, copolymers of vinyl chloride with a vinyl ester of a lower alkanoic acid, copolymers of vinyl chloride with an acrylic compound, and polyvinyl butyrals, and, as a polymerizable plasticizer therefor, a 2-acrylyloxychloropropoxy-2-oxo-1,3,2-dioxaphosphorinane, together with a plasticizer selected from the class consisting of the alkyl esters of saturated aliphatic dicarboxylic acids, the dialkyl phthalates and the trialkyl phosphates; said composition also containing a small amount of a peroxy polymerization catalyst.

9. A plasticized vinyl resin composition, which comprises a finely-divided emulsion-polymerized vinyl resin selected from the class consisting of the polyvinyl chlorides, copolymers of vinyl chloride with a vinyl ester of a lower alkanoic acid, copolymers of vinyl chloride with an acrylic compound, and polyvinyl butyrals, and, as a polymerizable plasticizer therefor a 2-crotonyloxychloropropoxy-2-oxo-1,3,2-dioxaphosphorinane; and a small amount of a peroxy polymerization catalyst.

10. A plasticized vinyl resin composition which comprises a finely-divided emulsion-polymerized vinyl resin selected from the class consisting of the polyvinyl chlorides, copolymers of vinyl chloride with a vinyl ester of a lower alkanoic acid, copolymers of vinyl chloride with an acrylic compound, and polyvinyl butyrals, and, as a polymerizable plasticizer therefor, a 2-crotonyloxychloropropoxy-2-oxo-1,3,2-dioxaphosphorinane substituted on at least one of the carbon atoms of the heterocyclic ring with at least one alkyl group; and a small amount of a peroxy polymerization catalyst.

11. A plasticized vinyl resin composition, which comprises a finely-divided emulsion-polymerized vinyl resin selected from the class consisting of the polyvinyl chlorides, copolymers of vinyl chloride with a vinyl ester of a lower alkanoic acid, copolymers of vinyl chloride with an acrylic compound, and polyvinyl butyrals, and, as a polymerizable plasticizer therefor a 2-crotonyloxychloropropoxy-2-oxo-1,3,2-dioxaphosphorinane, together with a plasticizer selected from the class consisting of the alkyl esters of saturated aliphatic dicarboxylic acids, the dialkyl phthalates, and the trialkyl phosphates; and a small amount of a peroxy polymerization catalyst.

12. A plasticized vinyl resin composition, which comprises a finely-divided emulsion-polymerized vinyl resin selected from the class consisting of the polyvinyl chlorides, copolymers of vinyl chloride with a vinyl ester of a lower alkanoic acid, copolymers of vinyl chloride with an acrylic compound, and polyvinyl butyrals, and, as a polymerizable plasticizer therefor, 5 - butyl - 5 - ethyl - 2 - methacrylyloxychloropropoxy - 2 oxo - 1,3,2 - dioxaphosphorinane; and a small amount of a peroxy polymerization catalyst.

13. A plasticized vinyl resin composition, which comprises a finely-divided emulsion-polymerized vinyl resin selected from the class consisting of the polyvinyl chlorides, copolymers of vinyl chloride with a vinyl ester of a lower alkanoic acid, copolymers of vinyl chloride with an acrylic compound, and polyvinyl butyrals, and, as a polymerizable plasticizer therefor, 5 - ethyl - 2 - methacrylyloxychloropropoxy - 2 - oxo - 4 - propyl - 1,3,2 - dioxaphosphorinane; and a small amount of a peroxy polymerization catalyst.

14. A plasticized vinyl resin composition, which comprises a finely-divided emulsion-polymerized vinyl resin selected from the class consisting of the polyvinyl chlorides, copolymers of vinyl chloride with a vinyl ester of a lower alkanoic acid, copolymers of vinyl chloride with an acrylic compound, and polyvinyl butyrals, and, as a polymerizable plasticizer therefor, 2 - acrylyloxychloropropoxy - 5 - butyl - 5 - ethyl - 2 - oxo - 1,3,2 - dioxaphosphorinane; and a small amount of a peroxy polymerization catalyst.

15. A plasticized vinyl resin composition, which comprises a finely-divided emulsion-polymerized vinyl resin selected from the class consisting of the polyvinyl chlorides, copolymers of vinyl chloride with a vinyl ester of a lower alkanoic acid, copolymers of vinyl chloride with an acrylic compound, and polyvinyl butyrals, and, as a polymerizable plasticizer therefor, a dialkyl methacrylyloxychloropropyl phosphate; and a small amount of a peroxy polymerization catalyst.

16. A plasticized vinyl resin composition, which comprises a finely-divided emulsion-polymerized vinyl resin selected from the class consisting of the polyvinyl chlorides, copolymers of vinyl chloride with a vinyl ester of a lower alkanoic acid, copolymers of vinyl chloride with an acrylic compound, and polyvinyl butyrals, and, as a polymerizable plasticizer therefor, diethyl methacrylyloxychloropropyl phosphate; and a small amount of a peroxy polymerization catalyst.

17. A plasticized vinyl resin composition, which comprises a finely-divided emulsion-polymerized vinyl resin selected from the class consisting of the polyvinyl chlorides, copolymers of vinyl chloride with a vinyl ester of a lower alkanoic acid, copolymers of vinyl chloride with an acrylic compound, and polyvinyl butyrals, and, as a polymerizable plasticizer therefor, di(n-butyl) methacrylyloxychloropropyl phosphate; and a small amount of a peroxy polymerization catalyst.

References Cited in the file of this patent

UNITED STATES PATENTS

| | | |
|---|---|---|
| 2,425,766 | Toy | Aug. 19, 1947 |
| 2,559,854 | Dickey et al. | July 10, 1951 |